J. C. BREEDEN.
GATE FOR JIGS.
APPLICATION FILED OCT. 4, 1911.
1,025,242.
Patented May 7, 1912.
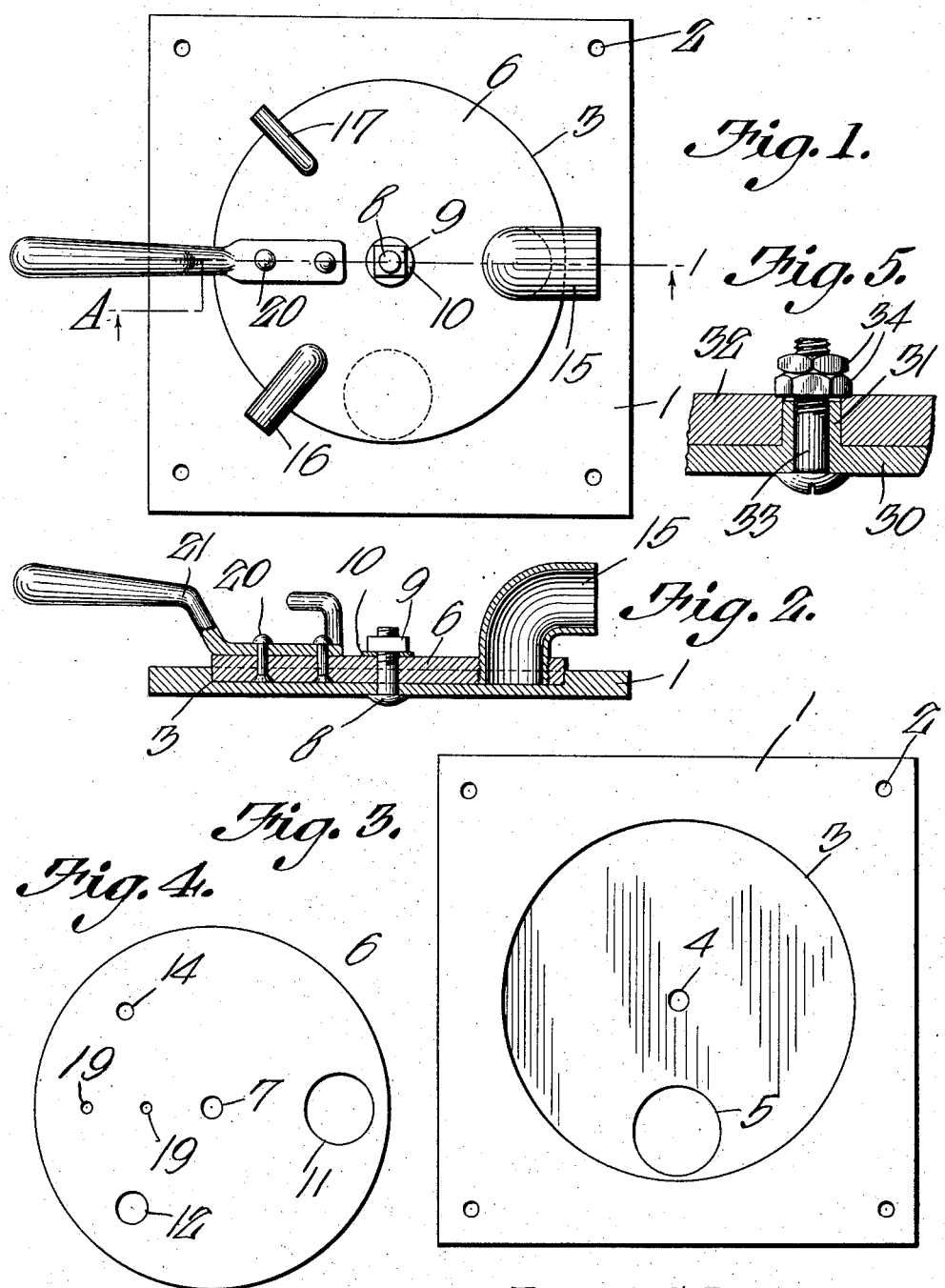
Witnesses
James C. Breeden, Inventor
by C. A. Snow & Co.
Attorneys

UNITED STATES PATENT OFFICE.

JAMES C. BREEDEN, OF ORONOGA, MISSOURI.

GATE FOR JIGS.

1,025,242.   Specification of Letters Patent.   Patented May 7, 1912.

Application filed October 4, 1911. Serial No. 652,888.

*To all whom it may concern:*

Be it known that I, JAMES C. BREEDEN, a citizen of the United States, residing at Oronoga, in the county of Jasper and State of Missouri, have invented a new and useful Gate for Jigs, of which the following is a specification.

The device forming the subject-matter of this application, is a gate for an ore jig, and the objects of the invention are to provide a gate which will permit streams of water of different sizes to be ejected from the gate, the construction being such that leakage from the jig will be prevented.

Jig gates as now constructed, are subject to rapid deterioration, resulting in leakage, and a consequent flooding of the elevator. Moreover, with the present forms of jig gates, it is almost impossible to close the gate so as to prevent a leakage and as a result, when the plant is opened, after a period of idleness, it will be found that all of the jigs are empty, it being thereupon necessary to suspend the operation of the plant for a considerable period of time, until the jigs are filled. In the present invention, leakage from the jig gates will be avoided, and the discharge from the jigs may be readily regulated.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in plan; Fig. 2 is a section on the line A—B of Fig. 1; Fig. 3 is a plan of the base plate; Fig. 4 is a plan of the rotatable element which acts as a cut-off; and Fig. 5 is a fragmental section, showing a modified means for connecting the base plate with the cut-off plate.

In carrying out the invention there is provided as a primary element, a flat base plate 1, preferably of rectangular contour, and provided adjacent its corners with openings 2, adapted to receive screws or the like, whereby the base plate 1 may be assembled with the jig. The outer face of the base plate 1 is provided with a circular recess 3, at the center of which there is an opening 4. Extended through the base plate 1, within the contour of the recess 3 is an opening 5.

The invention further includes a cut-off, in the form of a flat plate 6. The plate 6 is circular in outline, and is adapted to fit closely in the recess 3 of the base plate 1. The cut-off plate 6 is somewhat thicker than the depth of the recess 3, so that the plate 6 outstands slightly beyond the outer face of the base plate 1. The cut-off plate 6 is equipped with a central opening 7, adapted to be alined with the opening 4 in the base plate 1, and through these openings 4 and 7 is passed a pivot element, preferably taking the form of a bolt 8, the bolt 8 being provided upon its outer end with a nut 9, adapted to engage a washer 10, interposed between the nut 9 and the outer face of the cut-off plate 6. In the cut-off plate 6 are a series of openings 11, 12 and 14, adapted to be alined successively with the opening 5 in the base plate 1, when the cut-off member 6 is rotated, the centers of the openings 5, 11, 12 and 14 being located in a common circumference. There may be any number of openings in the cut-off plate 6 the showing of the openings 11, 12 and 14 being typical merely. Into the openings 11, 12 and 14, angle couplings 15, 16 and 17, respectively, are threaded, the outer ends of these angle couplings projecting beyond the periphery of the cut-off plate 6. In the cut-off plate 6 there are other openings 19, adapted to receive securing elements 20, the elements 20 serving as a means for attaching a radial handle 21 to the cut-off plate 16, the extremity of the handle 21 being spaced from the plane of the outer face of the cut-off plate 6, and being extended beyond the edge of the base plate 1, as clearly shown in Figs. 1 and 2.

The operation of the device is as follows. By seizing the handle 21, the cut-off plate 6 may be rotated upon the pivot element 8, bringing the openings 11, 12 and 14 successively into register with the opening 5 in the base plate 1. Thus as the openings 11, 12 and 14 and the respective couplings which are mounted therein, are of different diameters, it will be seen that the size of the stream issuing from the jig, may be regulated. Obviously, if the cut-off plate 6 is rotated until the opening 5 in the base plate 1 is disposed between two of the openings 11, 12 and 14 in the plate 6, egress of water through the openings 5 will be prevented. The device acts as a means for regulating the outflow from a jig, and owing to the coöperation of the parts 6 and 1, it will be seen that leakage will be prevented.

In Fig. 5 of the drawings, a modified form of the invention appears, the modification consisting solely in a change in the means whereby the cut-off plate is pivotally connected with the base plate.

Referring, then, to Fig. 5, the base plate is denoted by the numeral 30, the same having an upstanding, tubular stud 31, adapted to extend part way through the cut-off plate 32. A bolt 33 is mounted within the stud 31, and upon the threaded end of the bolt 33 are placed superposed nuts 34.

Having thus described the invention, what is claimed is:—

A device of the class described comprising a flat base plate provided with a circular recess in one face, and with an opening located within the recess; a flat, circular cut-off plate fitting closely in the recess and provided with openings of successively diminishing diameters, each opening in the cut-off plate being adapted to be alined successively with the opening in the base plate; angle couplings secured in the openings of the cut-off plate; a pivot element connecting the plates; and a handle secured to the cut-off plate and outstanding beyond the periphery of the same.

In testimony that I claim the foregoing as my own, I have hereto affixed my signature in the presence of two witnesses.

JAMES C. BREEDEN.

Witnesses:
 H. L. SHANNON,
 CHAS. J. AREY.

---

Copies of this patent may be obtained for five cents each, by addressing the "Commissioner of Patents, Washington, D. C."